US010766639B2

(12) United States Patent
Hay et al.

(10) Patent No.: US 10,766,639 B2
(45) Date of Patent: Sep. 8, 2020

(54) ACTUATED RESETTABLE SHOCKLESS HOLD DOWN AND RELEASE MECHANISM (ARES HDRM)

(71) Applicant: MACDONALD, DETTWILER AND ASSOCIATES INC., Brampton (CA)

(72) Inventors: Gavin Hay, Toronto (CA); Gregg G. Bull, Ballinafad (CA)

(73) Assignee: MACDONALD, DETTWILER AND ASSOCIATES INC., Brampton, ON (CA)

( * ) Notice: Subject to any disclaimer, the term of this patent is extended or adjusted under 35 U.S.C. 154(b) by 598 days.

(21) Appl. No.: 15/849,225

(22) Filed: Dec. 20, 2017

(65) Prior Publication Data

US 2018/0170585 A1    Jun. 21, 2018

Related U.S. Application Data

(60) Provisional application No. 62/437,179, filed on Dec. 21, 2016.

(51) Int. Cl.
*B64G 1/64* (2006.01)
*B64G 1/22* (2006.01)

(52) U.S. Cl.
CPC .............. *B64G 1/641* (2013.01); *B64G 1/222* (2013.01)

(58) Field of Classification Search
CPC .................................. B64G 1/641; B64G 1/222
USPC ....................................................... 244/173.3
See application file for complete search history.

(56) References Cited

U.S. PATENT DOCUMENTS

| 4,679,752 A | * | 7/1987 | Wittmann | B64G 1/645 |
| | | | | 244/173.3 |
| 5,002,418 A | * | 3/1991 | McCown | B64G 1/641 |
| | | | | 24/287 |
| 5,125,601 A | * | 6/1992 | Monford, Jr. | B64G 1/641 |
| | | | | 244/173.1 |
| 6,138,951 A | * | 10/2000 | Budris | B64G 1/002 |
| | | | | 102/393 |
| 10,062,537 B1 | * | 8/2018 | Vega | H01B 1/02 |
| 10,377,510 B1 | * | 8/2019 | Riskas | B64G 1/641 |
| 2003/0076215 A1 | * | 4/2003 | Baghdasarian | B64G 1/645 |
| | | | | 337/401 |
| 2010/0008611 A1 | * | 1/2010 | Weimer | G02B 7/1821 |
| | | | | 384/441 |

(Continued)

FOREIGN PATENT DOCUMENTS

| CN | 103231813 A | 8/2013 | |
| DE | 3106099 A1 | * 10/1982 | ............. B64G 1/222 |

(Continued)

OTHER PUBLICATIONS

International Search Report for PCT/CA2017/051560, dated Apr. 16, 2018, 3 Pages.

(Continued)

*Primary Examiner* — Christopher P Ellis
(74) *Attorney, Agent, or Firm* — Hill & Schumacher

(57) ABSTRACT

The present disclosure relates to a mechanism for releasably securing components of a spacecraft together during launch until such time as the mechanism is commanded to release those components. Upon command, the components are then released with extremely low shock forces being transmitted to the previously secured components due to the release.

37 Claims, 12 Drawing Sheets

(56) References Cited

U.S. PATENT DOCUMENTS

| | | | |
|---|---|---|---|
| 2011/0113605 A1* | 5/2011 | Plaza Baonza | B64G 1/645 |
| | | | 24/603 |
| 2012/0076614 A1* | 3/2012 | Baghdasarian | B64G 1/222 |
| | | | 411/427 |
| 2015/0329224 A1 | 11/2015 | Sachdev et al. | |
| 2018/0072434 A1* | 3/2018 | Novotney | B64G 1/222 |
| 2019/0144138 A1* | 5/2019 | Spark | H02S 30/20 |
| | | | 244/172.6 |

FOREIGN PATENT DOCUMENTS

| | | | |
|---|---|---|---|
| EP | 1191271 A2 * | 3/2002 | B64G 1/645 |
| EP | 2213572 A1 * | 8/2010 | B64G 1/222 |
| EP | 3351477 A1 * | 7/2018 | B64G 1/641 |
| EP | 3438003 A1 * | 2/2019 | B64G 1/222 |
| JP | 2006-193019 A | 7/2006 | |
| JP | 2014-113938 A | 6/2014 | |
| WO | 2008109993 A1 | 9/2008 | |

OTHER PUBLICATIONS

International Written Opinion for PCT/CA2017/051560, dated Apr. 16, 2018, 5 Pages.

* cited by examiner

ACTUATED RESETTABLE SHOCKLESS HOLD DOWN AND RELEASE MECHANISM (ARES HDRM)

FIELD

The present disclosure relates to a resettable mechanism for releasably securing components of a spacecraft together during launch until such time as the mechanism is commanded to release those components. Upon command, the components are then released with extremely low shock forces being transmitted to the previously secured components due to the release.

BACKGROUND

The launch of any spacecraft induces significant loads on the bus structure and all elements attached in addition to the forces that actually accelerate the payload into space. These include acoustic pressures, random vibrations, lateral and torsional forces, usually acting in combination and of sufficient magnitude to be significant design drivers for the spacecraft and any of its subcomponents. Spacecraft components whose function requires them to move or be repositioned after launch, such as, but not limited to, antenna arrays, pointing mechanisms, solar arrays, deployable masts, etc., must also be secured in their designed launch configuration in order to withstand the launch loads listed above and then be capable of successful release once in orbit so that they may fulfil their functions successfully.

The devices that secure these movable components during launch are generically referred to as Hold Down and Release Mechanisms (HDRMs). As part of their function to secure the move able components, they also usually form a significant part of the structural integrity of the secured component providing a connection to the spacecraft body of known rigidity and strength and allowing the secured component to be designed around those known capabilities. Having HDRMs capable of withstanding varying forces and torques allows the movable components to be more efficiently designed, thus lowering the overall mass of the spacecraft and providing a significant benefit to the spacecraft owner/operator.

HDRMs of various types have been used since the very first spacecraft flights and, because they form a significant part of the spacecraft structure, the connection between the moveable component and the rest of the spacecraft is usually under considerable load, generally in the form of significant tension, termed "pre-load" within the primary load sharing component within the HDRM. Affecting the release of the movable component from the spacecraft body involves eliminating this tension connecting the two. Virtually all existing HDRM devices release this connecting tension extremely quickly, in small fractions of a second, resulting in significant mechanical shocks to both the spacecraft and the released component. For extremely fragile or delicate spacecraft subsystems these shocks can be debilitating, requiring mitigation techniques to limit the damage these shocks can cause. Generally, these mitigation techniques involve making structures more robust which in turn results in added mass and reduced spacecraft performance and or increased launch costs.

In addition, the vast majority of existing HDRMs have a consumable element to the design with some part being broken, or burned through as part of the release process. This, then, requires that after each release cycle, including the needed testing release cycles required to prove the overall spacecraft design prior to launch, that some part of the HDRM must be replaced. Further reducing confidence in the release that occurs after launch, is the fact that the part that is actually the most important has never actually been tested. It is impossible with these systems to actually test every portion of the mechanism that is launched prior to flight. At least one sub component of the HDRM is new and untested at the time of first (and often only) release in space.

Presently, there are no HDRM mechanisms which release secured movable spacecraft components, provide the structural connection between the spacecraft and the released component, release the component with near-zero shock and are fully resettable with no new consumable sub components required.

SUMMARY

The present disclosure relates to a mechanism that structurally and releasably secures two items together and that upon command releases the two items in a manner which does not impart a mechanical shock to either released item. The HDRM mechanism disclosed herein, referred to as the Actuated Resettable Shockless (AReS) HDRM, uses the principles of wedges to provide a structural, virtually shockless release mechanism that may be repeatedly reset and that has no consumable sub components.

An embodiment disclosed herein provides a mechanism for releasably securing otherwise movable components of a spacecraft to the non-movable body of that spacecraft. Using the principle of sliding wedges, the invention discloses how actuator driven interfacing wedges can provide not only the needed structural connection between two items, but how the structural connection, or pre-load, between the two parts can be released in a manner that does not impart mechanical shock loads to either part. In addition, the use of actuator-driven wedges does not require any of the components of the HDRM to be damaged, broken or consumed during any release operations. This means that the exact same components that are to be used for the actual space operational release of the preload can be tested prior to the operation, greatly increasing reliability and reducing risks for what is always a critical operation. Failure of the release can stop the satellite from ever becoming operational.

Inherent in the mechanism disclosed herein is the ability to reset the mechanism to the preloaded state after a release of the preload with no other action than to place the parts together physically, relying on an electrical powered function to drive the actuator to rotate in an opposite direction to that needed to release the preload. This not only provides significant benefits prior to the initial operational release of the mechanism, but permits operations where the items previously secured together may be secured together again, repeatedly, and with the same level of structural connection as prior to the initial release.

In an embodiment there is provided resettable and shockless hold-down and release mechanism, comprising:

a) an active housing having a distal end which includes an attachment feature to attach it to a first object, said active housing having a first interface, a locking mechanism mounted in said active housing which includes engagement members extending beyond said first interface; and b) a passive housing having a distal end which includes an attachment feature to attach it to a second object, the passive housing having a second interface complimentary to said first interface to form a coupling between it and said first interface to give a structural connection between said active and passive housings, said passive housing being configured to receive therein said engagement members when a structural connection is formed between said active and passive housings, said passive housing having an internal structure complimentary to said engagement members, said locking mechanism including a reversible drive mechanism which, upon establishment of said structural connection, is configured to drive said engagement members radially outwards into physical contact with said internal structure thereby locking said active and passive housing assemblies together in a shockless manner, and reversing said drive mechanism causes said engagement members to physically disengage from said complimentary internal housing structure to release said active and passible housing assemblies from each other in a shockless manner.

The locking mechanism may include a pair of engagement members having proximal ends mounted in said active housing and distal ends extending out of said active housing beyond said first interface, said reversible drive mechanism including a movable member having a distal end and being moveable between said pair of engagement members and when moved towards said passive assembly said distal end bears against inner surfaces of said pair of engagement member distal ends and drives them radially outwards.

The engagement members may comprise a collet including at least two arcuate-shaped elongate collet arms, a proximal end of said elongate collet arms being structurally attached in said active housing, a distal end of each elongate collet arm having a collet wedge attached thereto, said collet wedges each having an outer surface having a shape that is complimentary to said internal structure of said passive housing, and wherein said movable member includes a plunger mounted on a lead screw, a proximal end of said lead screw operably connected to an actuator for reversibly driving said plunger forwards and backwards, the actuator including electrical connections for being connected to a control mechanism for controlling actuation of said actuator, a distal end of said lead screw located between said collet wedges, said arcuate-shaped elongate collet arms being configured such that said collet wedges are inclined towards said distal end of said lead screw when said plunger is not in physical contact with said collet wedges, and wherein when said actuator is configured to drive said plunger forwards toward, and backwards from, said distal end of said lead screw.

The collet wedges may have internal wedge surfaces which contact an outer surface of said plunger, said internal structure of said passive housing having wedge surfaces designed to be complimentary to selected outer wedge surfaces on said collet wedges, wherein said internal wedge surfaces are selected in combination with said passive housing wedge surfaces and said outer wedge surfaces such that when said plunger drives said collet wedges apart said selected outer wedge surfaces are driven into their complimentary wedge surfaces in said passive housing forcing the collet wedges further away from said proximal end of said elongate arms thereby generating a preselected tension within said elongate arms.

The active housing may be comprised of two active housing sections configured to be bolted together, and including a shim of preselected thickness separating said two active housing sections, the thickness of said shim being preselected to produce said preselected tension in said collet arms. The actuator may be configured to move plunger towards said proximal end of said lead screw at a speed slow enough to release said preselected tension and avoid generating mechanical shock.

The structural connection between said active and passive housing may be re-established by physically mating the same said passive housing or a different passive housing to said active housing and driving said engagement members into contact with said complimentary internal structure of said passive housing thereby giving a resettable and shockless hold-down and release mechanism.

The attachment mechanism located on the distal end of said active housing may include an attachment feature peripherally extending around said active housing having bolt holes for bolting said active housing to said first part of a releasable assembly, and wherein said attachment mechanism located on the distal end of said passive housing includes an attachment feature peripherally extending around said passive housing having bolt holes for bolting said active housing to said second part of a releasable assembly.

The first and second interfaces may be Hirth interfaces.

The mechanism may further comprise a sensor system mounted on one or both of said active and passive housings for enabling remote operator control of all activities associated with aligning, coupling and decoupling the active and passive housings based on feedback from said sensor system. This sensor system may comprise any one or combination of a camera based vision system, radar and LIDAR.

The mechanism may further comprise a positioning device to position and mate the passive housing to the active housing whose control system uses said sensor system to perform this alignment.

The mechanism may further comprise a positioning device to position and mate the active housing to the passive housing whose control system uses said sensor system to perform this alignment.

The first object may be a spacecraft and wherein the second object is a spacecraft payload or alternatively the first object is a spacecraft payload and wherein the second object is a spacecraft.

In an embodiment there is provided a method of resettably and shocklessly mating and decoupling releasable assemblies, comprising:

a) affixing an active housing to a first object, said active housing having a distal end having a first interface and a reversible locking mechanism including engagement members mounted in said active housing which extend beyond said first interface, said reversible locking mechanism configured to move said engagement members laterally outwards; and b) affixing a passive housing to a second object, said passive housing having a distal end having a second interface complimentary to said first interface to form a coupling between it and said first interface to give a structural connection between said active and passive housings, said passive housing being configured to receive therein said engagement members when a structural connection is formed between said active and passive housings, said passive housing having an internal structure complimentary to said engagement members;

c) aligning said active and passive housing and forming a structural connection between said active and passive housings such that said engagement members are positioned within said passive housing;

d) activating the reversible locking mechanism to move said engagement members radially outwards and into physical engagement with and internal housing structure of said passive housing complimentary to said engagement members so that when said engagement members are in physical contact with said internal housing structure the active and passive housings are locked together in a shockless manner, and e) if it is desired to release the active and passive housing, activating the reversible locking mechanism to move said engagement members inwards away from physical contact with said internal housing structure thereby releasing the active and passive housings in a shockless manner.

The locking mechanism may include a reversible drive mechanism which, upon establishment of said structural connection, is configured to drive said engagement members radially outwards into physical contact with said internal structure thereby locking said active and passible housing assemblies together in a shockless manner, and reversing said drive mechanism causes said engagement members to physically disengage from said complimentary internal housing structure to release said active and passible housing assemblies from each other in a shockless manner.

The first object may be a spacecraft and wherein the second object may be a spacecraft payload or alternatively the first object may be a spacecraft payload and wherein the second object may be a spacecraft.

A further understanding of the functional and advantageous aspects of the disclosure can be realized by reference to the following detailed description and drawings.

BRIEF DESCRIPTION OF THE DRAWINGS

Embodiments of the mechanism for releasably securing components of a spacecraft together during launch will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

The following is a description of the preferred embodiment of the AReS HDRM. Additional embodiments will also be described.

Figure 1:
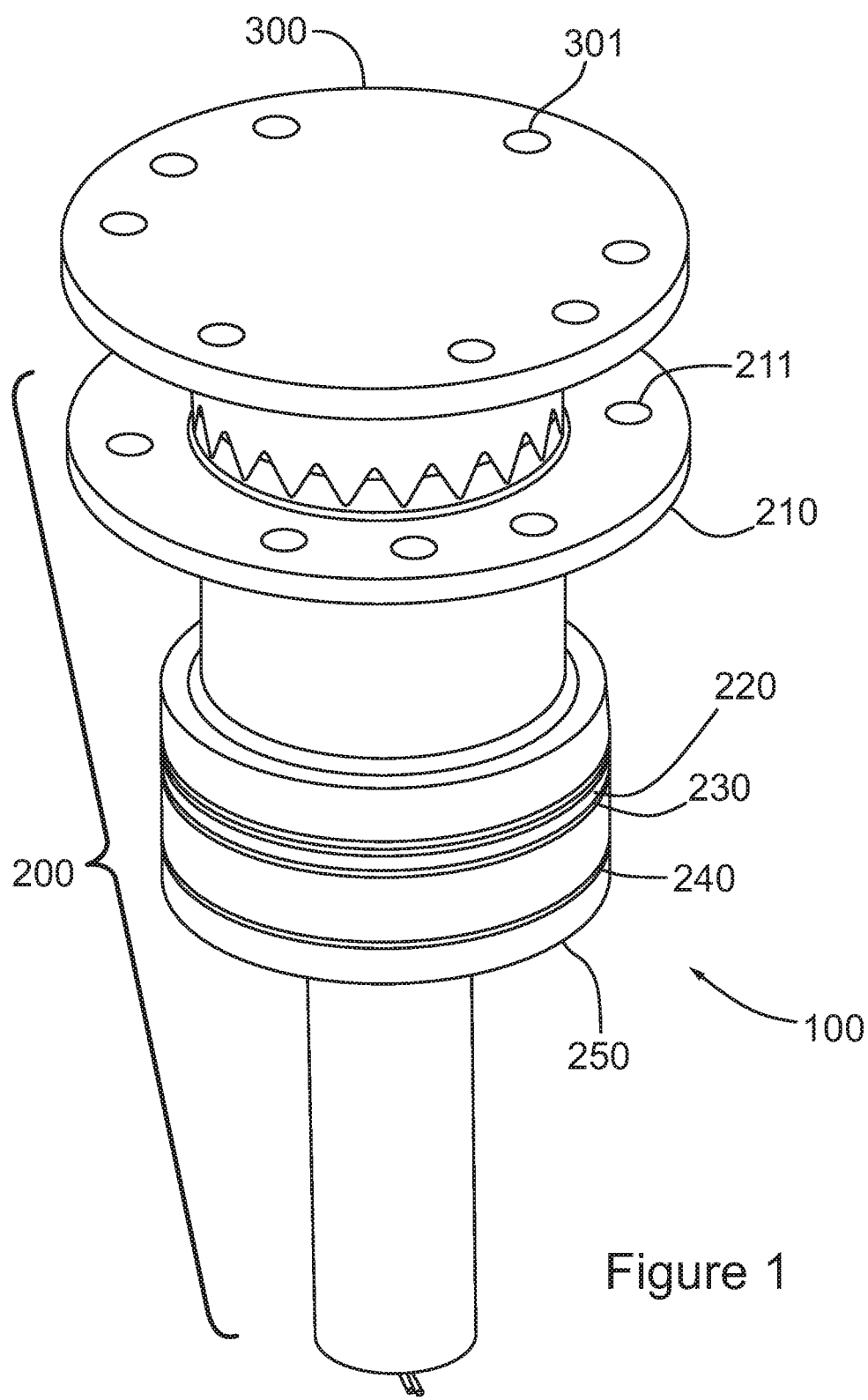
FIG. 1 is an isometric exterior view of an embodiment of an actuated resettable and shockless hold-down and release mechanism constructed in accordance with the present disclosure.
Figure 2:
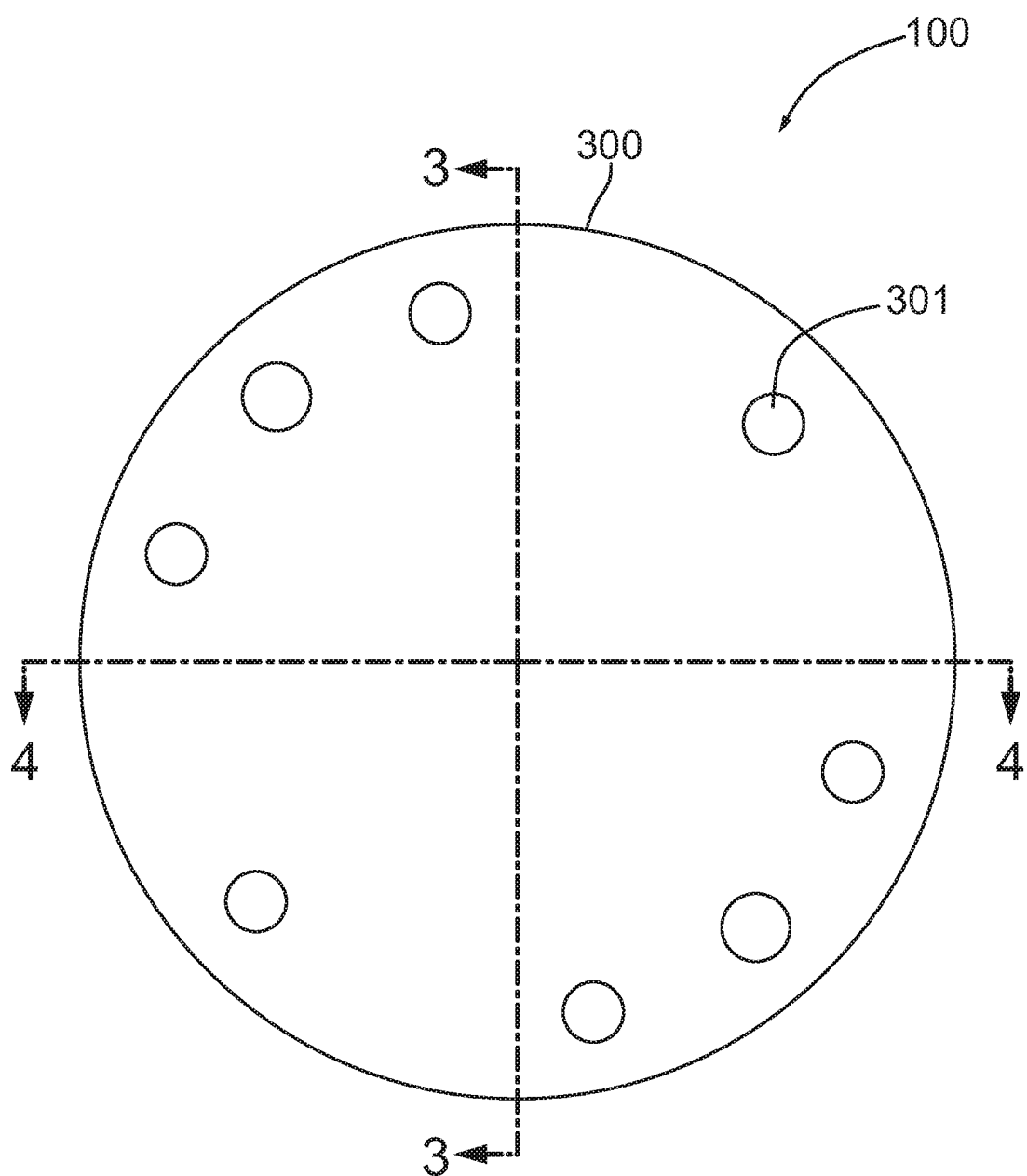
FIG. 2 is a top view of the mechanism of FIG. 1 taken along arrow 2 of FIG. 1.

FIG. 1 shows an isometric exterior view of the AReS HDRM 100 showing the passive housing 300, the active housing assembly 200 and mounting holes 301 and 211. The active housing assembly 200 components visible include the active housing 210, preload shim 220, collet 230, bearing housing 240 and actuator assembly 250. FIG. 2 shows a top view of the AReS HDRM 100.

Figure 3:
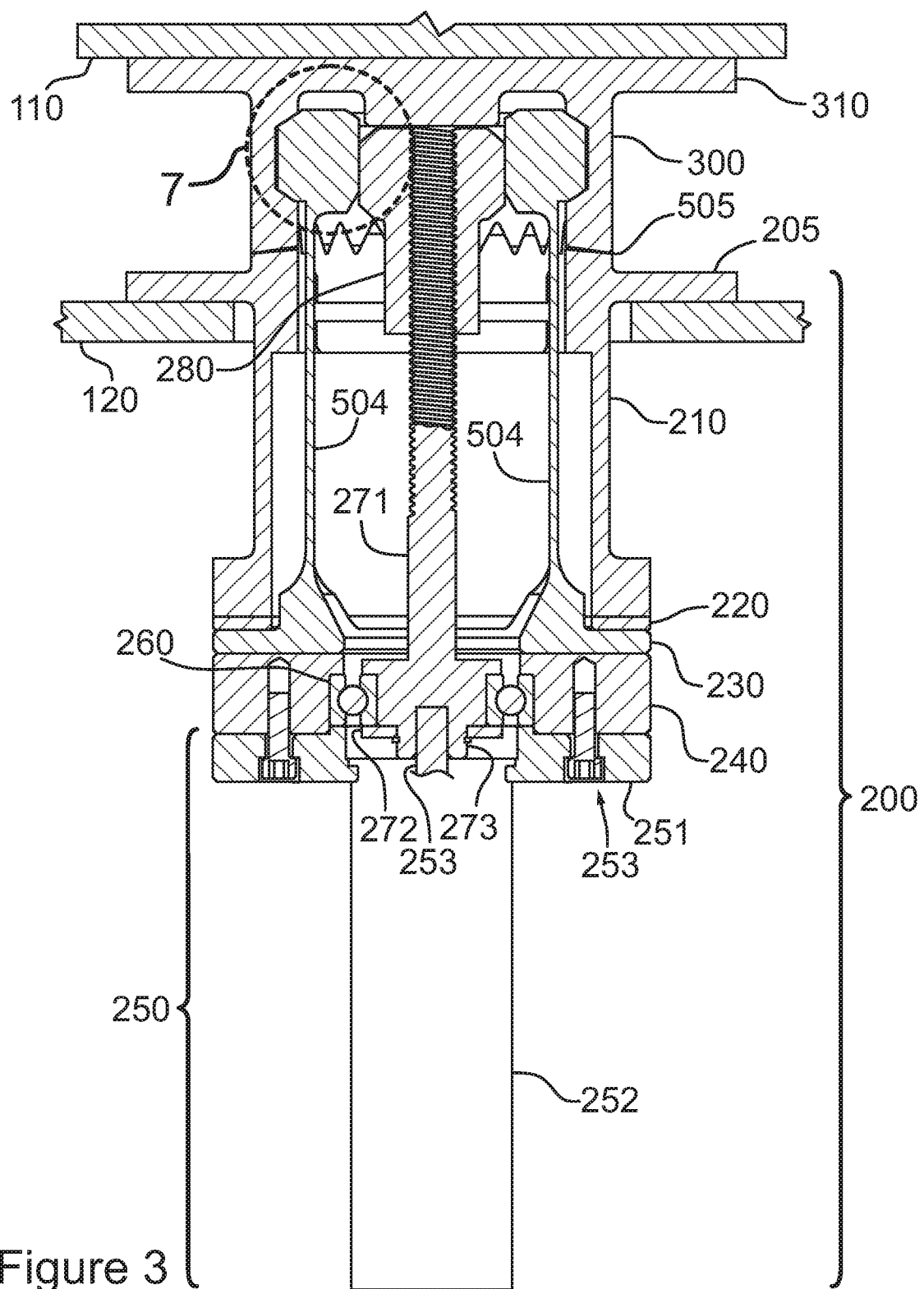
FIG. 3 is a cross section view taken along line 3-3 of FIG. 2 showing the internal structure of the mechanism.

FIG. 3 shows a cross section view taken along line 3-3 of FIG. 2 showing further details of the passive housing 300 and the active housing assembly 200. It also shows how the two objects, 110 and 120 are connected by the AReS HDRM 100 (see FIG. 1). The active housing 200 assembly components visible include the active housing 210, preload shim 220, collet 230, bearing housing 240, actuator assembly 250, bearing 260, lead screw 271, bearing washer 272, fasteners 253, bearing retainer 273 and plunger 280. Actuator assembly 250 comprises actuator plate 251, and actuator 252. This figure also shows the passive housing 300 attached to its object 110 via attachment feature 310 and the active housing 210 attached to its object 120 via attachment feature 205. In one proposed use of the AReS, object 110 is a payload which is releasibly and resettabley secured to object 120 which is a spacecraft. In an alternate application of the AReS, the object 110 is a spacecraft and object 120 is a payload which can be connected with the AReS in a releasable and resettable manner. Object 110 can be connected to passive housing 300 at attachment feature 310 with one of a variety of methods such as discrete fasteners (bolts), threaded interfaces, welding, integral machining, etc. Similarly, object 120 can be connected to active housing 210 at attachment feature 205 with one of the same variety of fastening technologies.

It is noted that the attachment feature may be an annular flange having holes extending therethrough which match corresponding holes in an attachment feature on the object(s) to which it is being attached.

Figure 4:
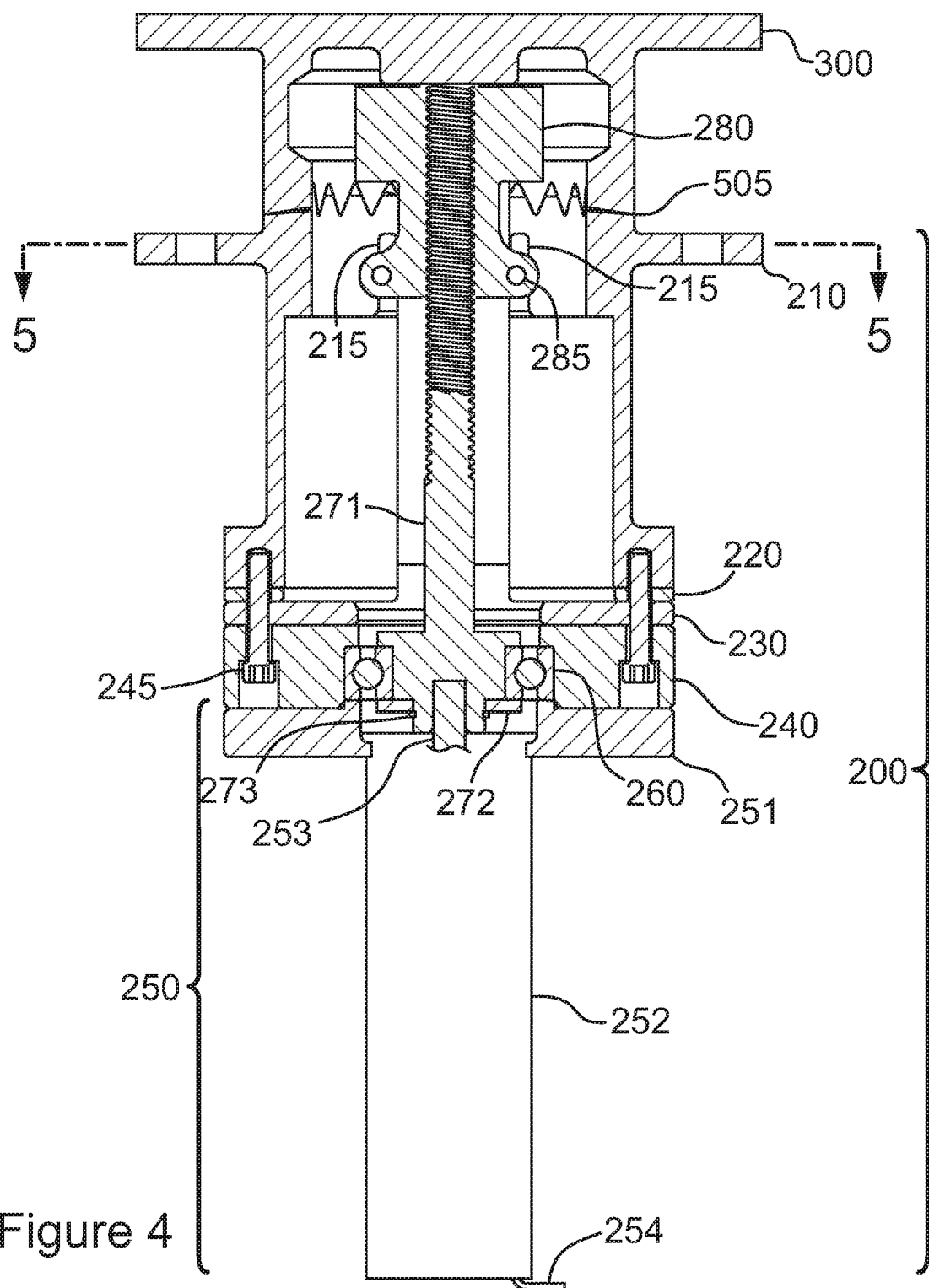
FIG. 4 is a cross section view taken along line 4-4 of FIG. 2 showing further details of the mechanism.

FIG. 4 shows a cross section view taken along line 4-4 of FIG. 2 showing further details of the passive housing 300 and the active housing assembly 200. The active housing assembly components visible include the active housing 210, preload shim 220, collet 230, bearing housing 240, actuator assembly 250, bearing 260, lead screw 271, bearing washer 272, fasteners 245, bearing retainer 273, plunger guides 285 and plunger 280. Actuator assembly 250 comprises actuator plate 251, actuator 252 and actuator harness 254. The interface between passive housing 300 and active housing assembly 200 is shown at 505.

Figure 5:
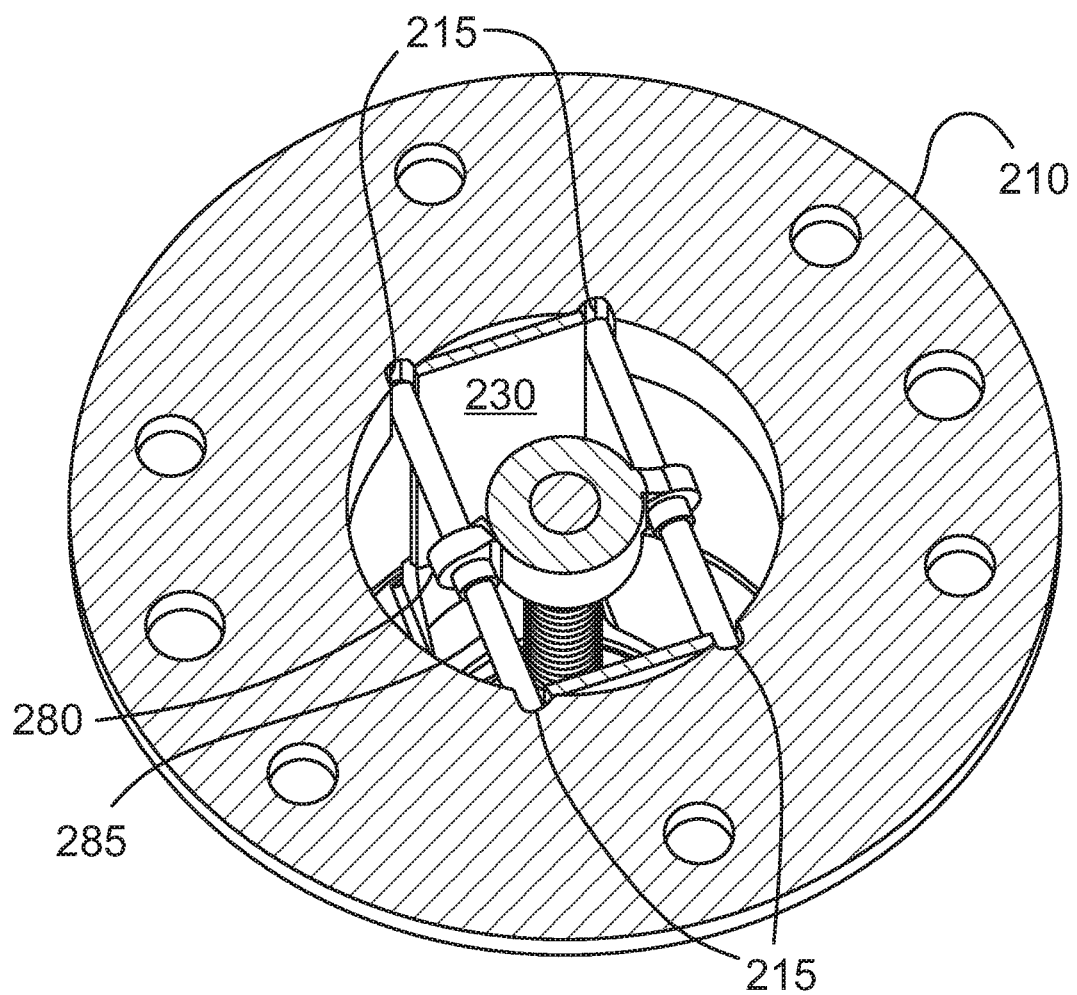
FIG. 5 is a cross section view taken along line 5-5 of FIG. 4.

FIG. 5 shows a cross section view taken along line 5-5 of FIG. 4 showing how the plunger guides 285 are connected to the plunger 280, run in grooves 215 in the active housing 210 and are located on either side of the collet 230.

Figure 6:
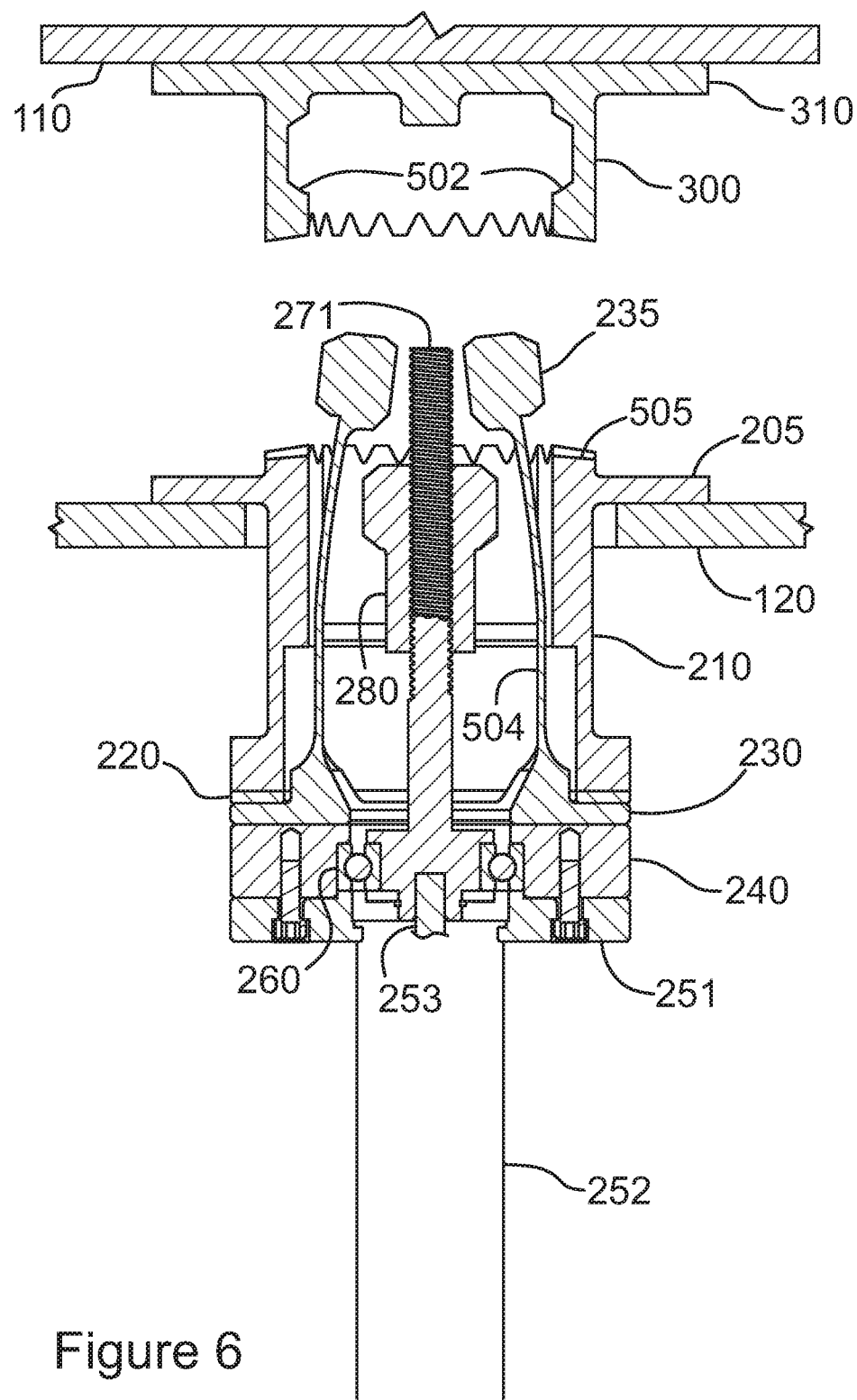
FIGS. 6, 6a, 6b, 6c, 6d and 6e are cross sections along the line 3-3 of FIG. 2 illustrating the sequence of operation of the mechanism.
Figure 6A:
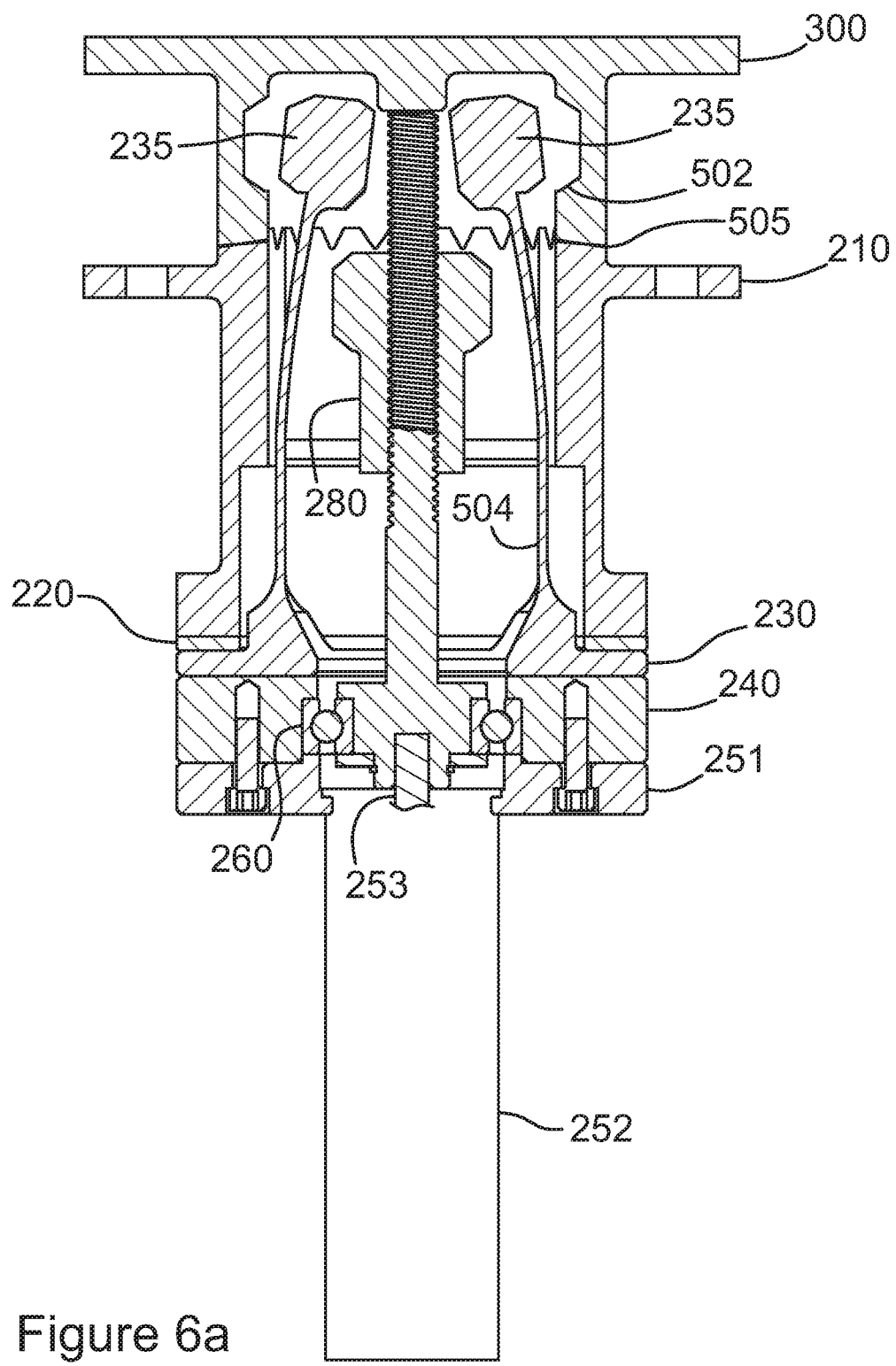
Figure 6B:
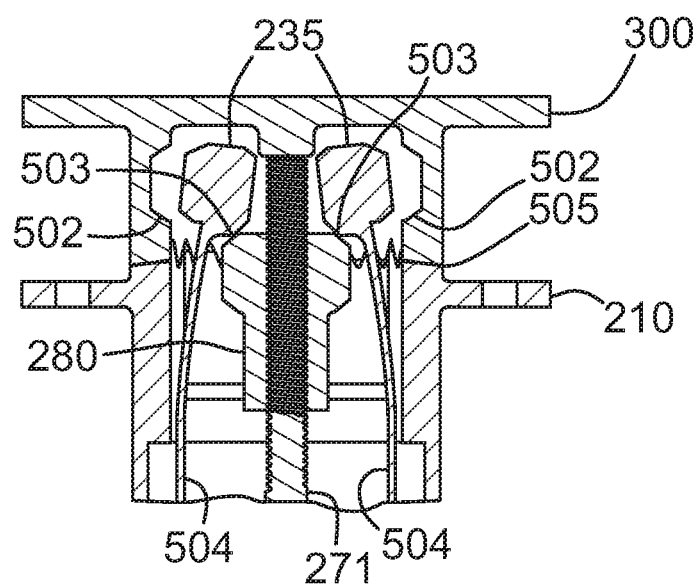
Figure 6C:
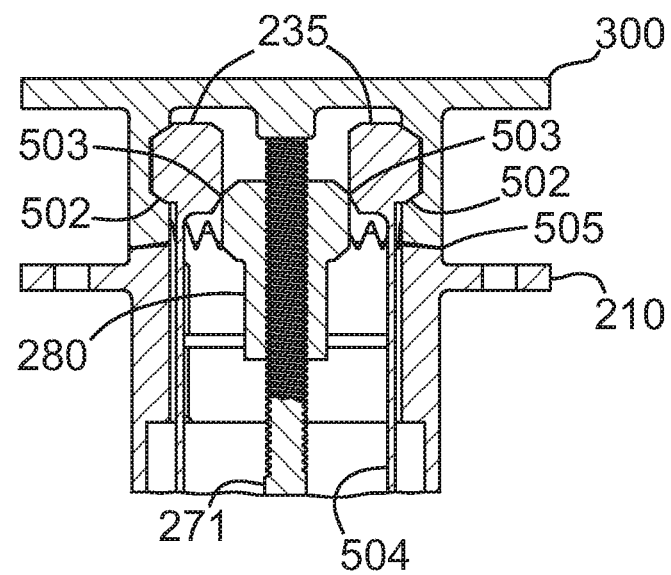
Figure 6D:
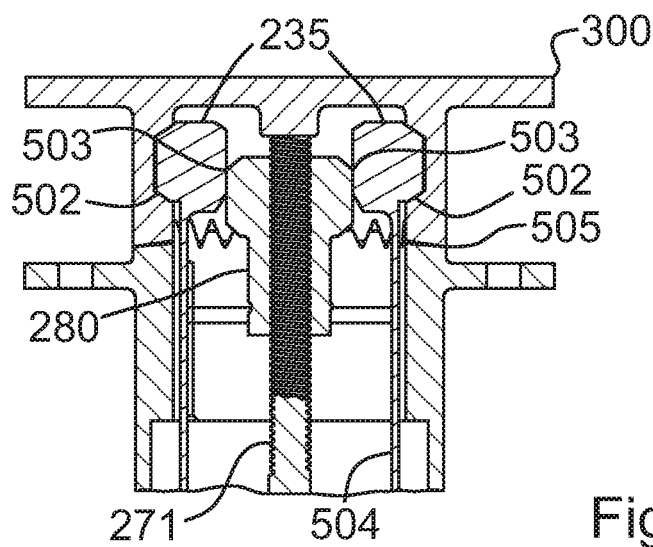
Figure 6E:
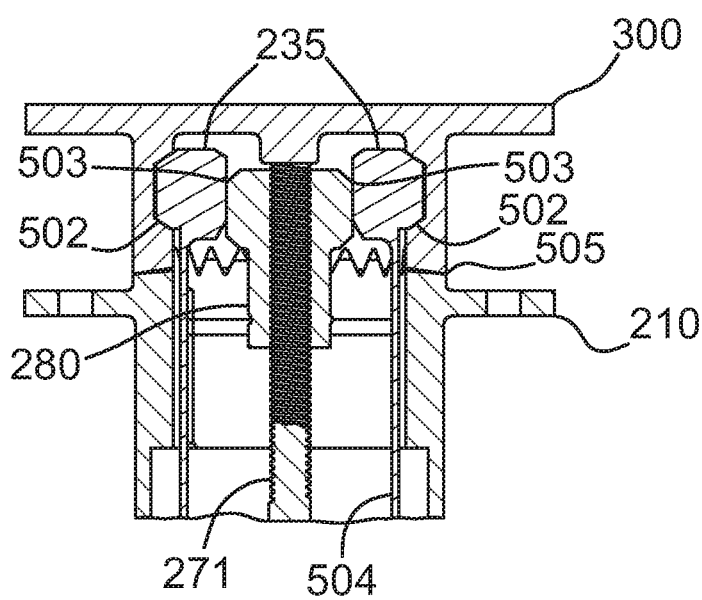

FIGS. 6 through 6e show cross sections along the line 3-3 of FIG. 2 illustrating the sequence of operation of the mechanism showing the passive housing 300 attached to its object 110 via attachment feature 310, the active housing assembly 200, the active housing 210 attached to its object 120 via attachment feature 205, preload shim 220, collet 230, collet wedges 235, collet arms 504, bearing housing 240, actuator plate 251, and actuator 252, bearing 260, lead screw 271, plunger 280, interface 505, contact point 503, and contact surface 502. This figure also illustrates how the separation of the active housing assembly 200 from the passive housing 300 acts to allow two objects, 110 and 120 to be separated if the HDRM is in the "released" state compared to being structurally attached if the HDRM is in the "armed" condition (see FIG. 3).

Figure 7:
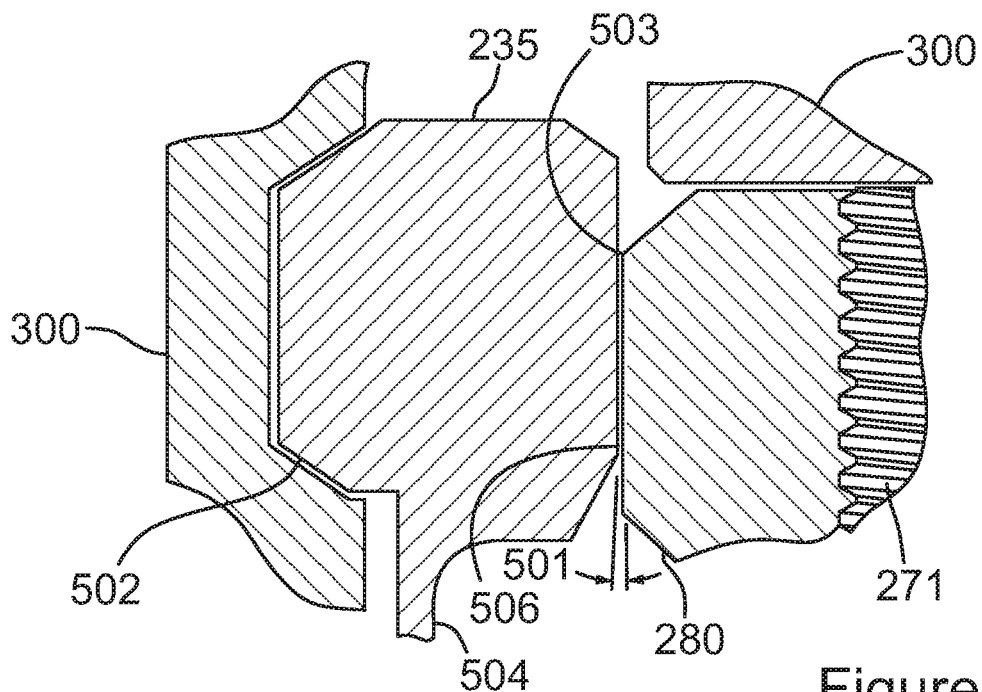
FIG. 7 is a magnified view of detail 7 of FIG. 3.

FIG. 7 is a magnified view of detail 7 of FIG. 3 showing the interaction between the plunger 280, lead screw 271 and the passive housing 300 when the AReS HDRM has achieved the full structural preload. It shows the contact surfaces 502 and contact point 503 and the wedge angle 501.

Figure 8:
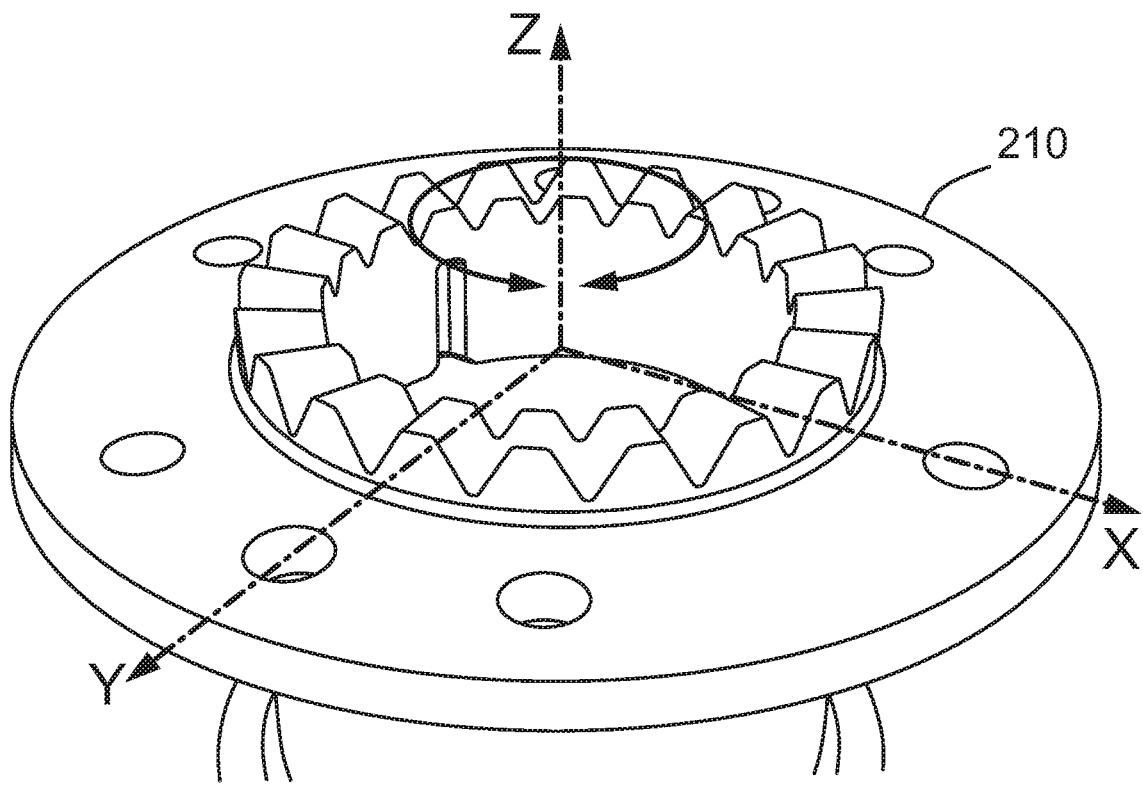
FIG. 8 is a coordinate system where axis Z lies along the axis of the active housing 210 and mutually orthogonal axes X and Y.

FIG. 8 shows a coordinate system where axis Z lies along the axis of the active housing 210 and mutually orthogonal axes X and Y. The orientation of axes X and Y about axis Z is notional and not significant to the operation of the mechanism.

Figure 9:
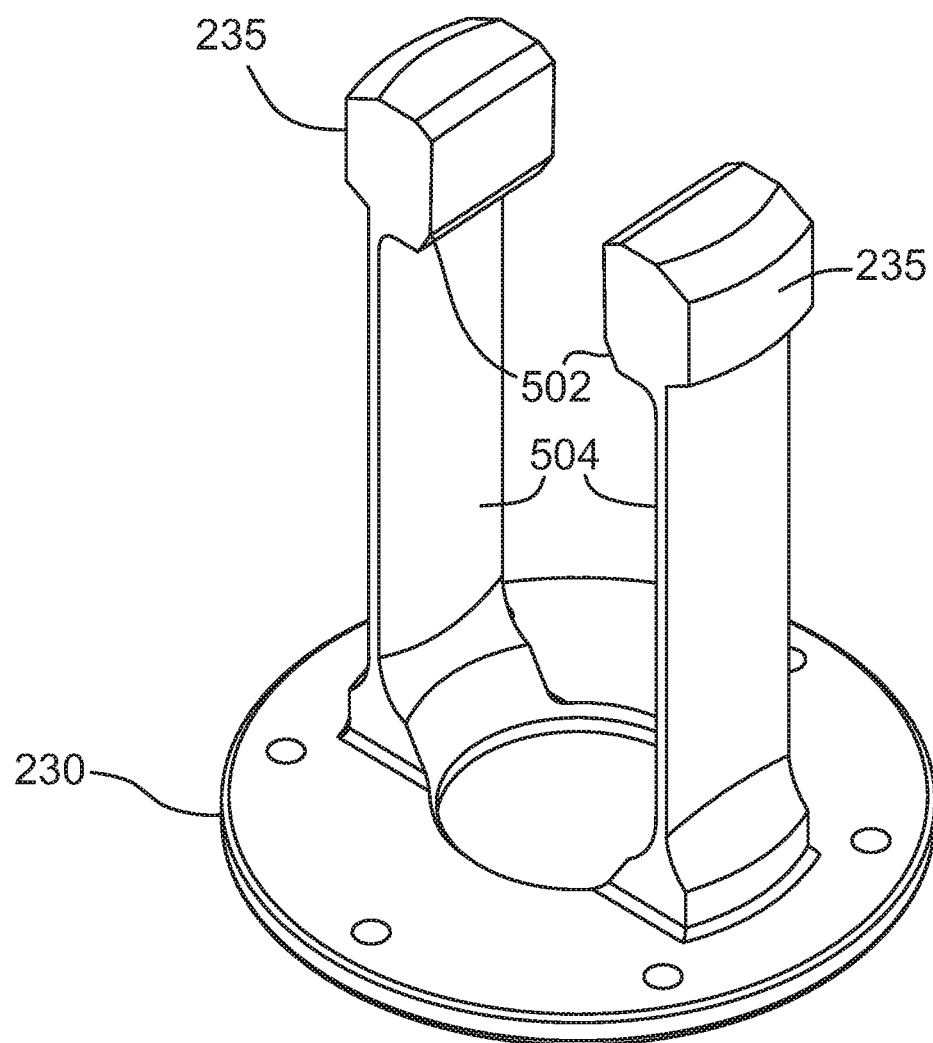
FIG. 9 is an isometric view of the collet in the "armed" state.

FIG. 9 shows an isometric view of only the collet 230 for illustrative purposes. The collet arms 504 are shown in the straightened configuration as if the mechanism was in the "armed" state. Also visible are the collet wedges 235 and the contact surfaces 502 and 506.

Figure 10:
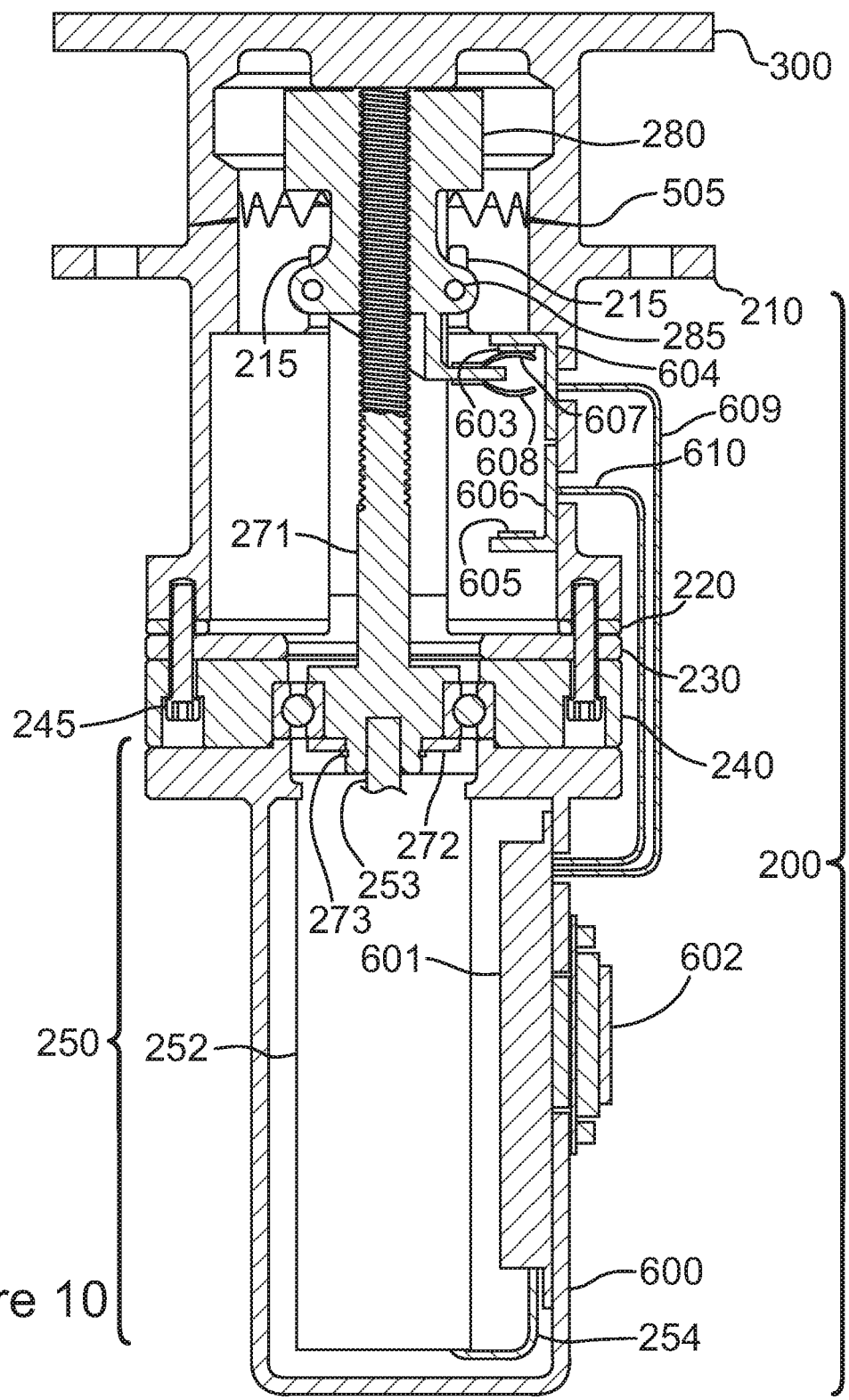
FIG. 10 is a cross section of an alternate embodiment taken along line 4-4 of FIG. 2.

FIG. 10 shows an alternate embodiment and is a repeat of FIG. 4 showing details of the features of the alternate embodiment including the passive housing 300 and the active housing assembly 200. The active housing assembly components visible include the active housing 210, preload shim 220, collet 230, bearing housing 240, actuator assembly 250, bearing 260, lead screw 271, bearing washer 272, fasteners 245, bearing retainer 273, plunger guides 285 and plunger 280. Actuator assembly 250 comprises actuator housing 600, actuator 252, actuator harness 254, avionics board 601, and connector 602. The alternate embodiment also includes "armed" switch surface 603, "armed" switch support 604, "armed" switch contact 607, "released" switch surface 605, "released" switch support 606, "released" switch contact 608, "armed" switch harness 609 and "released" switch harness 610.

Method of Operation

The AReS HDRM device disclosed herein uses the principles of wedges to achieve not only the desired structural preload required to properly support items attached to each portion of the mechanism but also, because no parts are damaged, modified or consumed in the operation of the mechanism, to permit reusability and increased reliability.

The AReS HDRM is used to permit two objects 110 and 120 to be releasably and resettably structurally connected to each other, each portion of the HDRM being attached to one or the other object, 110 or 120. To release the two portions of the mechanism, and thereby release the two objects 110 and 120, they first must be properly attached to each other and the desired preload tension achieved in the collet 230 that will support the required loads that will be applied through the HDRM 100. As shown in FIG. 6 the passive housing 300 starts out separate from the active housing assembly 200. In this configuration, the HDRM 100 state is defined as being "released". The two housings 200 and 300 may be attached to the items to be released at this point or they can be fastened to those items after the HDRM 100 has been preloaded, or "armed". Holes 301 and 210 (see FIG. 1) are provided to mount the mechanism to the two items to be releasably attached. For the sake of clarity of this description, it will be assumed that the preloaded HDRM 100 will be attached to the items to be released after the preload has been achieved. Whether the preload is achieved before or after the HDRM 100 is attached to the two items to be released does not affect the sequence of operations.

Step 1

FIG. 6 shows the two parts of the mechanism prior them being mated. Passive housing 300 attached to its object 110 via attachment feature 310 is completely separate from the active housing assembly 200 with the active housing 210 attached to its object 120 via attachment feature 205. All parts are in their fully "released" state.

Step 2

The first step in preloading the HDRM 100 is to bring the passive housing 300 into contact with the active housing assembly 200 at the mating interface 505, see FIG. 6a. The actuator 252 has not rotated the lead screw 271 at all at this point. In this embodiment the interface 505 is a Hirth coupling, capable of reacting rotational and in-plane loads. These couplings are well known to those skilled in the art. Different embodiments exchange the Hirth coupling interface for different interfaces and will be described below.

Step 3

The actuator 252 is attached to the lead screw 271 through the actuator drive shaft 253 and the lead screw is threaded into the plunger 280. The actuator 252 rotates the lead screw 271 such that it causes the plunger 280 to advance towards the passive housing 300. FIG. 6b illustrates the plunger 280 just at the moment it contacts the collet wedges 235 at the two contact points 503 and prior to any movement of the collet wedges 235. In the released state the collet arms 504 are curved inwards such that the collet wedges 235 are clear of the interior diameter of the passive housing 300.

It is understood that the lead screw 271 may be exchanged for other devices used to convert rotational motion into a linear motion, such as ball screws or a rack and pinion should they be more advantageous for a particular application. Additionally the actuator 252 may be any device capable of providing rotational movement upon command, such as, but not limited to, an electric motor.

Step 4

As shown in FIG. 6c, the plunger 280 continues to be advanced. The contact points 503 between the plunger 280 and the collet wedges 235 change as the plunger 280 is advanced and the orientation of the collet wedges 235 change and rotate as they move radially outward and into the complementary grooves in the passive housing 300. As they move radially outwards, the collet wedges 235 begin to come into contact with the passive housing 300 along surface 502.

Step 5

FIG. 6d shows how the lead screw 271 continues to advance the plunger 280 which forces the collet wedges 235 outwards and further into engagement with the complementary grooves in the interior surface of the passive housing 300 along surface 502. The arms 504 of the collet 230 straighten as the collet wedges 235 are pushed into the grooves in the passive housing 300.

Step 6

A detail of the fully engaged collet wedge 235 is shown in FIG. 7. The continued advancement of the plunger 280 eventually causes the wedge of the collet 230 to contact the passive housing 300 along surface 502, which is inclined. The interior surface 506 of the collet wedge 235 is tapered at predetermined angle 501. This angle 501 is such that as the plunger 280 advances, the collet wedge 235 is pushed outwards and thereby up surface 502 only as far as needed to stretch the collet arms 504 sufficiently to attain the desired preload between the passive housing 300 and the active housing assembly 200.

As the actuator 252 continues to advance the plunger 280, the contact point 503 between the interior wedge surface 506 and the plunger 280 moves to force the collet wedge 235 further into the complementary groove in the passive housing 300. Once full contact has occurred along surface 502, additional advancement of the plunger 280 acts to force the collet wedge 235 further up inclined surface 502 acting to induce tension or preload in the collet arms 504.

Step 7

Once a predetermined advancement of the plunger 280 has been achieved then the desired preload in the collet arms 504 will have also been achieved. FIG. 6e shows the plunger 280 at its fully extended position and the collet wedges 235 in fully engaged with the passive housing 300 along surface 502.

Several methods can be used to establish when the plunger 300 has been advanced sufficiently to achieve the desired preload. These include counting rotations of the lead screw 271, using strain gauges to sense the tension or preload in the collet arms 504 or, as in this embodiment, using a shim 220 coupled with stalling the actuator 252.

As shown in FIG. 4, the actuator 252 is powered and commanded via harness 254, and during the manufacturing process the thickness of shim 220 is adjusted to ensure that when the plunger 280 contacts the underside of the passive housing 300 and causes the actuator 252 to stall, or exceed its current limit, that the collet wedges 235 have been forced up surface 502 sufficiently to generate the required tension in the collet arms 504. Depending upon the desired preload and the materials and methods used to make the passive housing 300, active housing 210 and collet 230, there may not be a need for a separate shim.

To prevent the plunger 280 from rotating prior to contact with the collet wedges 235, the plunger 280 is guided by guide pins 285 that run in grooves 215 in the inner surface of the active housing 210, see FIGS. 4 and 5.

Referring to FIG. 4, lead screw 271 is supported in bearing housing 240 by bearing 260 which is then retained on the shaft of the lead screw 271 by bearing washer 272 and bearing retainer 273. Fasteners 245 are used to hold the bearing housing 240, the collet 230 and the shim 220 to the active housing 210. Fasteners 253 (FIG. 3) are used to hold the actuator assembly 250 to the bearing housing 240.

Once the preload between the passive housing 300 and the active housing assembly 200 has been achieved, the entire HDRM 100 is considered "armed". To change to the "released" state, the preceding operations to achieve the preload are essentially reversed. The actuator 252 is commanded to rotate the plunger 280 in the opposite direction such that the plunger 280 moves away from the passive housing 300. This acts to first release the preload or tension in the collet arms 504 over a period of time lasting several seconds. This release of the preload over time is the key to achieving ultra-low mechanical shock and is the key discriminator between the device disclosed herein and virtually all other release mechanisms.

With the preload released the plunger 280 is moved still further away from the passive housing 300 and without the plunger 280 forcing them apart, the collet wedges 235, pull out of their complementary grooves in the passive housing 300 to the point where the passive housing, 300 may be freely separated from the active housing assembly 200. The HDRM has now returned to the "released" state.

If the passive housing 300 is again placed upon the active housing assembly 200 at the mating interface 505, the HDRM 100 may again be driven to the "armed" state with no additional changes to the mechanism. This ability to repeatedly cycle between the "armed" and "released" states, with the exact same components used each time, is key to the reusable nature of the present capture and release mechanism and is also key to increasing the reliability of the entire assembly because all of the components to be used operationally may be tested prior to operation.

Additional Embodiments

As described above, the interface between the passive housing 300 and the active housing 210 is a Hirth coupling. These couplings provide a structural connection that can react rotational as well as in-plane loads in the plane orthogonal to the axis of the coupling (frequently referred to reacting loads in the X-Y plane and moments about the Z axis, see FIG. 8).

In another embodiment, the interface can be the well-known "cup and cone" design which does not restrict rotation about the Z axis and reacts all other loads and moments.

A further embodiment replaces the Hirth coupling with a slotted plate that permits motion in one direction in a plane and about the Z axis and reacts all other loads and moments.

A further embodiment replaces the Hirth coupling with a plate with a hole larger than the diameter of the collet such that it permits sliding motion in the plane of the plate and rotation about the Z axis but reacts all other loads and moments.

Release may be controlled or triggered by an automatic command from the spacecraft control computer at a specified point in the operation plan, with the AReS release triggered through spacecraft data bus connection from the spacecraft computer. Alternatively, triggering of the release can occur from an operator command from the ground. This command is provided at a ground station, which via a communication link to the spacecraft computer allows the triggering of the AReS.

The physical action of coupling the passive and active portions of the AReS can be done manually, or an assembly rig can be used to offer the payload with passive housing attached up to the active assembly to mate the two interfaces.

A further embodiment permits the AReS HDRM to be backwards compatible with any spacecraft control system that provides only a short firing pulse for releasing standard pyrotechnic release mechanisms. Additional features of this embodiment are sensors to establish when the plunger is in the "armed" or "released" state, avionics that interpret the pulse provided by the spacecraft and use that pulse, plus the signals returned from the sensors, to controllably apply power to the actuator to drive the mechanism. The advantage of this embodiment is that it permits the AReS HDRM to be used with spacecraft control systems that are already configured to accommodate pyrotechnic release mechanisms without requiring a change to those control systems, providing easy integration of the AReS HDRM with legacy spacecraft control systems.

As shown in FIG. 10, the plunger 280 incorporates features to support the "armed" switch contact 607 and the "released" switch contact 608. When the AReS HDRM is in the "armed" state, as shown in FIG. 10, the "armed" switch contact 607 is in electrical contact with the "armed" switch surface 603, structurally supported on the "armed" switch support 604, it closes a circuit providing a signal to the avionics board 601, within the actuator housing 600, via the "armed" switch harness 609.

When the signal to release the HDRM is received from the spacecraft via the connector 602, the avionics board 601 is configured to apply electrical power, also supplied from the spacecraft via connector 602, to the actuator 252 thereby moving the plunger 280. As the plunger 280 retracts, the "armed" switch contact 607 electrically separates from the "armed" switch surface 603 breaking the circuit in the "armed" switch harness 609. The avionics board 601 uses this to sense that the plunger 280 is retracting and continues to apply power to the actuator 252 until the "retracted" switch contact 608 comes into electrical contact with the "retracted" switch surface 605, supported on "retracted" switch support 606, closing a circuit in the "retracted" switch harness 610 which signals to the avionics board 601 that the plunger 280 is fully retracted and the active housing assembly 200 has released the passive housing 300. The avionics board 601 then ceases to supply power to the actuator 252 and the motion of the plunger 280 ceases. As per descriptions above, with the plunger 280 retracted, the collet 230 has released the passive housing 300 and the two portions of the AReS HDRM may now separate.

It will be understood that other sensors may be used to establish the position of the plunger 280 and report it to the avionics board 601, such as potentiometers, resolvers, microswitches, etc.

Due to the resettable nature of the mechanism a further embodiment uses the mechanism as a releasable structural fastener for environments where using conventional fasteners may not be possible. In such environments, possibly outer space or within a nuclear reactor, as examples, the active housing assembly 200 and the passive housing assembly 300 may be affixed to items that have never previously been mated and, due to human or robotic means, are mated for the first time within the environment. Actuation of the mechanism to the armed state will form a structural attachment between the two items. In this way the AReS may be used to stow items within the environment or used to assemble multiple items together for use in that environment as a larger assemblage.

In this embodiment, the remote coupling of the active and passive housing assemblies 200 and 300 could be enabled by a positioning device (for example a robotic arm/manipulator) and sensors mounted on one or both of housings 200 and 300. The positioning device could be used to position and mate an object 110 to a second object 120, by positioning and mating the passive housing assembly 300 already attached to 120 on to the active housing assembly 200 already attached to 120. In an alternate embodiment, the positioning device is used to position and mate an object 120 to a second object 110, by positioning and mating the active housing assembly 200 already attached to 120 on to the passive housing assembly 300 already attached to 110. Positioning the passive housing assembly 300 with respect to the active housing assembly 200 (or active housing assembly 200 with respect to passive housing assembly 300 with sufficient accuracy to permit mating may be accomplished in several ways, which include, but are not limited to autonomous control of the positioning device by a computer control system or human-in-the-loop command from a remote location, possibly using communication with a ground station, using various sensors that may include cameras, radar or LIDAR.

It will be also understood that although the passive housing 300 and active housing 210 have been shown as components separate from the items to be released, the operable features of the passive housing 300 and active housing 210 can be manufactured integral with one or the other or both items to be released providing a further benefit from reduced overall mass.

The foregoing description of the preferred embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

Therefore what is claimed is:

1. A resettable and shockless hold-down and release mechanism, comprising:
    a) an active housing having a distal end which includes an attachment feature to attach it to a first object, said active housing having a first interface, a locking mechanism mounted in said active housing which includes engagement members extending beyond said first interface; and
    b) a passive housing having a distal end which includes an attachment feature to attach it to a second object, the passive housing having a second interface complimentary to said first interface to form a coupling between it and said first interface to give a structural connection between said active and passive housings, said passive housing being configured to receive therein said engagement members when a structural connection is formed between said active and passive housings, said passive housing having an internal structure complimentary to said engagement members, said locking mechanism including a reversible drive mechanism which, upon establishment of said structural connection, is configured to drive said engagement members radially outwards into physical contact with said internal structure thereby locking said active and passive housing assemblies together in a shockless manner, and reversing said drive mechanism causes said engagement members to physically disengage from said complimentary internal housing structure to release said active and passible housing assemblies from each other in a shockless manner.

2. The mechanism according to claim 1 wherein said locking mechanism includes a pair of engagement members having proximal ends mounted in said active housing and distal ends extending out of said active housing beyond said first interface, said reversible drive mechanism including a movable member having a distal end and being moveable between said pair of engagement members and when moved towards said passive assembly said distal end bears against inner surfaces of said pair of engagement member distal ends and drives them radially outwards.

3. The mechanism according to claim 2 wherein said engagement members comprise a collet including at least two arcuate-shaped elongate collet arms, a proximal end of said elongate collet arms being structurally attached in said active housing, a distal end of each elongate collet arm having a collet wedge attached thereto, said collet wedges each having an outer surface having a shape that is complimentary to said internal structure of said passive housing, and wherein said movable member includes a plunger mounted on a lead screw, a proximal end of said lead screw operably connected to an actuator for reversibly driving said plunger forwards and backwards, said actuator including electrical connections for being connected to a control mechanism for controlling actuation of said actuator, a distal end of said lead screw located between said collet wedges, said arcuate-shaped elongate collet arms being configured such that said collet wedges are inclined towards said distal end of said lead screw when said plunger is not in physical contact with said collet wedges, and wherein when said actuator is configured to drive said plunger forwards toward, and backwards from, said distal end of said lead screw.

4. The mechanism according to claim 3, wherein said collet wedges have internal wedge surfaces which contact an outer surface of said plunger, said internal structure of said passive housing having wedge surfaces designed to be complimentary to selected outer wedge surfaces on said collet wedges, wherein said internal wedge surfaces are selected in combination with said passive housing wedge surfaces and said outer wedge surfaces such that when said plunger drives said collet wedges apart said selected outer wedge surfaces are driven into their complimentary wedge surfaces in said passive housing forcing the collet wedges further away from said proximal end of said elongate arms thereby generating a preselected tension within said elongate arms.

5. The mechanism according to claim 1, wherein said active housing is comprised of two active housing sections configured to be bolted together, and including a shim of preselected thickness separating said two active housing sections, the thickness of said shim being preselected to produce said preselected tension in said collet arms.

6. The mechanism according to claim 5 wherein said actuator is configured to move said plunger towards said proximal end of said lead screw at a speed slow enough to release said preselected tension and avoid generating mechanical shock.

7. The mechanism according to claim 1, wherein the structural connection between said active and passive housing may be re-established by physically mating the same said passive housing or a different passive housing to said active housing and driving said engagement members into contact with said complimentary internal structure of said passive housing thereby giving a resettable and shockless hold-down and release mechanism.

8. The mechanism according to claim 1, wherein said attachment mechanism located on the distal end of said active housing includes an attachment feature peripherally extending around said active housing having bolt holes for bolting said active housing to said first part of a releasable assembly, and wherein said attachment mechanism located on the distal end of said passive housing includes an attachment feature peripherally extending around said passive housing having bolt holes for bolting said active housing to said second part of a releasable assembly.

9. The mechanism according to claim 1, wherein said first and second interfaces are Hirth interfaces.

10. The mechanism according to claim 1, further comprising a sensor system mounted on one or both of said active and passive housings for enabling remote operator control of all activities associated with aligning, coupling and decoupling the active and passive housings based on feedback from said sensor system.

11. The mechanism according to claim 10, wherein said sensor system comprises any one or combination of a camera based vision system, radar and LIDAR.

12. The mechanism according to claim 10 further comprising a positioning device to position and mate the passive housing to the active housing whose control system uses said sensor system to perform this alignment.

13. The mechanism according to claim 10 further comprising a positioning device to position and mate the active housing to the passive housing whose control system uses said sensor system to perform this alignment.

14. The mechanism according to claim 1 wherein the first object is a spacecraft and wherein the second object is a spacecraft payload.

15. The mechanism according to claim 1 wherein the first object is a spacecraft payload and wherein the second object is a spacecraft.

active housing having a distal end which includes an attachment feature to attach it to a first object.

16. A resettable and shockless hold-down and release mechanism, comprising:
  a) an active housing assembly having a first housing having a distal end which includes an attachment feature configured to be attached to a first object, and including a first interface, a locking mechanism mounted in said housing which includes a movable member, and a pair of engagement members having proximal ends mounted in said first housing and distal ends extending out of said first housing beyond said first interface, said locking mechanism configured such that the movable member is moveable between said pair of engagement members and when moved towards said active assembly distal end it bears against inner surfaces of said engagement member distal ends and drives them radially outwards;
  b) a passive housing assembly having a second housing having a distal end which includes an attachment feature to configured to attach it to a second object, said second housing have a second interface complimentary to said first interface to form a coupling between it and said first interface to give a structural connection between said first and second housings, said second housing being configured to receive said distal ends of said engagement members prior to them being engaged by said movable member and having an internal structure complimentary with outer surfaces of said engagement member distal ends such that when said first and second housings are structurally connected, movement of said movable member towards said second housing drives said engagement members radially outwards into physical contact with said complimentary internal housing structure thereby locking said active and passible housing assemblies together in a shockless manner, and upon moving said movable member back away from said second housing said engagement members physically disengage from said complimentary internal housing structure to release said active and passible housing assemblies together in a shockless manner.

17. The mechanism according to claim 16 wherein said engagement members comprise a collet including at least two arcuate-shaped elongate collet arms, a proximal end of said elongate collet arms being structurally attached in said active housing, a distal end of each elongate collet arm having a collet wedge attached thereto, said collet wedges each having an outer surface having a shape that is complimentary to said internal structure of said passive housing, and wherein said movable member includes a plunger mounted on a lead screw, a proximal end of said lead screw operably connected to an actuator for reversibly driving said plunger forwards and backwards, said actuator including electrical connections for being connected to a control mechanism for controlling actuation of said actuator, a distal end of said lead screw located between said collet wedges, said arcuate-shaped elongate collet arms being configured such that said collet wedges are inclined towards said distal end of said lead screw when said plunger is not in physical contact with said collet wedges, and wherein when said actuator is configured to drive said plunger forwards toward, and backwards from, said distal end of said lead screw.

18. The mechanism according to claim 17, wherein said collet wedges have internal wedge surfaces which contact an outer surface of said plunger, said internal structure of said passive housing having wedge surfaces designed to be complimentary to selected outer wedge surfaces on said collet wedges, wherein said internal wedge surfaces are selected in combination with said passive housing wedge surfaces and said outer wedge surfaces such that when said plunger drives said collet wedges apart said selected outer wedge surfaces are driven into their complimentary wedge surfaces in said passive housing forcing the collet wedges further away from said proximal end of said elongate arms thereby generating a preselected tension within said elongate arms.

19. The mechanism according to claim 16, wherein said active housing is comprised of two active housing sections configured to be bolted together, and including a shim of preselected thickness separating said two active housing sections, the thickness of said shim being preselected to produce said preselected tension in said collet arms.

20. The mechanism according to claim 19 wherein said actuator is configured to move said plunger towards said proximal end of said lead screw at a speed slow enough to release said preselected tension and avoid generating mechanical shock.

21. The mechanism according to claim 16, wherein the structural connection may be re-established by physically mating the same or a different passive housing to said active housing and driving said engagement members into contact with said complimentary internal structure of said passive housing thereby giving a resettable and shockless hold-down and release mechanism.

22. The mechanism according to claim 16, wherein said attachment feature on said active housing includes an annular flange peripherally extending around said active housing having bolt holes for bolting said active housing to said first object, and wherein said attachment feature located on the distal end of said passive housing includes an annular flange peripherally extending around said active housing having bolt holes for bolting said active housing to said second object.

23. The mechanism according to claim 16, wherein said first and second interfaces are Hirth interfaces.

24. The mechanism according to claim 16, wherein the first object is a spacecraft and wherein the second object is a spacecraft payload.

25. The mechanism according to claim 16, wherein the first object is a spacecraft payload and wherein the second object is a spacecraft.

26. An actuated resettable and shockless hold-down and release mechanism, comprising:
   a) an active housing assembly including an active housing having a distal end which includes an attachment feature to attach it to a first object, said active housing having a first interface, including a collet including at least two arcuate-shaped elongate arms, a proximal end of said elongate arms structurally engaged with said active housing, a distal end of each elongate arm having a collet wedge attached thereto;
   a lead screw having a plunger engaged therewith, an actuator including electrical connections for being connected to a control mechanism for controlling actuation of said actuator, a proximal end of said lead screw operably connected to said actuator, a distal end of said lead screw located between said collet wedges, said arcuate-shaped elongate arms configured such that said collet wedges are inclined towards said distal end of said lead screw;
   b) a passive housing assembly including a passive housing having a distal end which includes an attachment feature to attach it to a second object, said passive housing have a second interface to form a coupling between it and said first interface on said active assembly housing to give a structural connection between said passive housing and said active housing with said first and second interfaces mated to each other, said passive housing having an internal structure complimentary with said collet wedges; and
   c) said passive housing assembly having an internal housing structure configured so that, upon said plunger being driven towards said passive housing assembly, said plunger engages said collet wedges to drive them radially outwards into physical contact with said internal housing structure so that upon engagement said actuator ceases movement thereby locking said active and passible housing assemblies together in a shockless manner, and wherein the active and passive housing assemblies are released in a shockless manner by withdrawing said plunger away from said passive housing assembly.

27. The mechanism according to claim 26, wherein said collet wedges having internal wedge surfaces which contact an outer surface of said plunger, said internal structure of said passive housing having wedge surfaces designed to be complimentary to selected outer wedge surfaces on said collet wedges, wherein said internal wedge surfaces are selected in combination with said passive housing wedge surfaces and said outer wedge surfaces such that when said plunger drives said collet wedges apart said selected outer wedge surfaces are driven into their complimentary wedge surfaces in said passive housing forcing the collet wedges further away from said proximal end of said elongate arms thereby generating a preselected tension within said elongate arms.

28. The mechanism according to claim 26 wherein said actuator is configured to move said plunger towards said proximal end of said lead screw at a speed slow enough to release said preselected tension and avoid generating mechanical shock.

29. The mechanism according to claim 26, wherein the structural connection may be re-established by physically mating the same or a different passive housing to said active housing assembly and driving said collet wedges into contact with said internal of said passive housing thereby giving a resettable and shockless hold-down and release mechanism.

30. The mechanism according to claim 26, wherein said housing is made of two housing sections configured to be bolted together, and including a shim of preselected thickness separating said two housing sections, the thickness of said shim preselected to create said preselected tension in the said collet arms.

31. The mechanism according to claim 26, wherein said first and second interfaces are Hirth interfaces.

32. The mechanism according to claim 26, wherein the first object is a spacecraft and wherein the second object is a spacecraft payload.

33. The mechanism according to claim 26, wherein the first object is a spacecraft payload and wherein the second object is a spacecraft.

34. A method of resettably and shocklessly mating and decoupling releasable assemblies, comprising:
   a) affixing an active housing to a first object, said active housing having a distal end having a first interface and a reversible locking mechanism including engagement members mounted in said active housing which extend beyond said first interface, said reversible locking mechanism configured to move said engagement members laterally outwards; and
   b) affixing a passive housing to a second object, said passive housing having a distal end having a second interface complimentary to said first interface to form a coupling between it and said first interface to give a structural connection between said active and passive housings, said passive housing being configured to receive therein said engagement members when a structural connection is formed between said active and passive housings, said passive housing having an internal structure complimentary to said engagement members;
   c) aligning said active and passive housing and forming a structural connection between said active and passive housings such that said engagement members are positioned within said passive housing;
   d) activating the reversible locking mechanism to move said engagement members radially outwards and into physical engagement with and internal housing structure of said passive housing complimentary to said engagement members so that when said engagement members are in physical contact with said internal housing structure the active and passive housings are locked together in a shockless manner, and
   e) if it is desired to release the active and passive housing, activating the reversible locking mechanism to move said engagement members inwards away from physical contact with said internal housing structure thereby releasing the active and passive housings in a shockless manner.

35. The method according to claim 34 wherein said locking mechanism including a reversible drive mechanism which, upon establishment of said structural connection, is configured to drive said engagement members radially outwards into physical contact with said internal structure thereby locking said active and passible housing assemblies together in a shockless manner, and reversing said drive mechanism causes said engagement members to physically disengage from said complimentary internal housing structure to release said active and passible housing assemblies from each other in a shockless manner.

36. The method according to claim 34, wherein the first object is a spacecraft and wherein the second object is a spacecraft payload.

37. The method according to claim 34, wherein the first object is a spacecraft payload and wherein the second object is a spacecraft.

* * * * *

UNITED STATES PATENT AND TRADEMARK OFFICE
CERTIFICATE OF CORRECTION

PATENT NO. : 10,766,639 B2
APPLICATION NO. : 15/849225
DATED : September 8, 2020
INVENTOR(S) : Gavin Hay et al.

It is certified that error appears in the above-identified patent and that said Letters Patent is hereby corrected as shown below:

In the Specification

SUMMARY, Column 2, beginning at Line 55, and extending to Column 3, Line 15, should read as follows:
In an embodiment there is provided resettable and shockless hold-down and release mechanism, comprising:
    a) an active housing having a distal end which includes an attachment feature to attach it to a first object, said active housing having a first interface, a locking mechanism mounted in said active housing which includes engagement members extending beyond said first interface; and
    b) a passive housing having a distal end which includes an attachment feature to attach it to a second object, the passive housing having a second interface complementary to said first interface to form a coupling between it and said first interface to give a structural connection between said active and passive housings, said passive housing being configured to receive therein said engagement members when a structural connection is formed between said active and passive housings, said passive housing having an internal structure complementary to said engagement members, said locking mechanism including a reversible drive mechanism which, upon establishment of said structural connection, is configured to drive said engagement members radially outwards into physical contact with said internal structure thereby locking said active and passive housing assemblies together in a shockless manner, and reversing said drive mechanism causes said engagement members to physically disengage from said complementary internal housing structure to release said active and passible housing assemblies from each other in a shockless manner.

SUMMARY, Column 3, between Lines 25-45, should read as follows:
The engagement members may comprise a collet including at least two arcuate-shaped elongate collet arms, a proximal end of said elongate collet arms being structurally attached in said active housing, a distal end of each elongate collet arm having a collet wedge attached thereto, said collet wedges each having an outer surface having a shape that is complementary to said internal structure of said passive housing, and wherein said movable member includes a plunger mounted on a lead screw, a proximal end of said lead screw operably connected to an actuator for reversibly driving said plunger forwards and backwards, the actuator including electrical connections for being connected to a control Signed and Sealed this
Twenty-seventh Day of December, 2022

Katherine Kelly Vidal
*Director of the United States Patent and Trademark Office* mechanism for controlling actuation of said actuator, a distal end of said lead screw located between said collet wedges, said arcuate-shaped elongate collet arms being configured such that said collet wedges are inclined towards said distal end of said lead screw when said plunger is not in physical contact with said collet wedges, and wherein when said actuator is configured to drive said plunger forwards toward, and backwards from, said distal end of said lead screw.

SUMMARY, Column 3, between Lines 46-58, should read as follows:
The collet wedges may have internal wedge surfaces which contact an outer surface of said plunger, said internal structure of said passive housing having wedge surfaces designed to be complementary to selected outer wedge surfaces on said collet wedges, wherein said internal wedge surfaces are selected in combination with said passive housing wedge surfaces and said outer wedge surfaces such that when said plunger drives said collet wedges apart said selected outer wedge surfaces are driven into their complementary wedge surfaces in said passive housing forcing the collet wedges further away from said proximal end of said elongate arms thereby generating a preselected tension within said elongate arms.

SUMMARY, Column 4, between Lines 1-7, should read as follows:
The structural connection between said active and passive housing may be re-established by physically mating the same said passive housing or a different passive housing to said active housing and driving said engagement members into contact with said complementary internal structure of said passive housing thereby giving a resettable and shockless hold-down and release mechanism.

SUMMARY, beginning with Column 4, Line 39, should read as follows:
In an embodiment there is provided a method of resettably and shocklessly mating and decoupling releasable assemblies, comprising:
    a) affixing an active housing to a first object, said active housing having a distal end having a first interface and a reversible locking mechanism including engagement members mounted in said active housing which extend beyond said first interface, said reversible locking mechanism configured to move said engagement members laterally outwards; and
    b) affixing a passive housing to a second object, said passive housing having a distal end having a second interface complementary to said first interface to form a coupling between it and said first interface to give a structural connection between said active and passive housings, said passive housing being configured to receive therein said engagement members when a structural connection is formed between said active and passive housings, said passive housing having an internal structure complementary to said engagement members;
    c) aligning said active and passive housing and forming a structural connection between said active and passive housings such that said engagement members are positioned within said passive housing;
    d) activating the reversible locking mechanism to move said engagement members radially outwards and into physical engagement with and internal housing structure of said passive housing complementary to said engagement members so that when said engagement members are in physical contact with said internal housing structure the active and passive housings are locked together in a shockless manner, and
    e) if it is desired to release the active and passive housing, activating the reversible locking mechanism to move said engagement members inwards away from physical contact with said internal housing structure thereby releasing the active and passive housings in a shockless manner.

SUMMARY, Column 5, between Lines 9-19, should read as follows:

The locking mechanism may include a reversible drive mechanism which, upon establishment of said structural connection, is configured to drive said engagement members radially outwards into physical contact with said internal structure thereby locking said active and passible housing assemblies together in a shockless manner, and reversing said drive mechanism causes said engagement members to physically disengage from said complementary internal housing structure to release said active and passible housing assemblies from each other in a shockless manner.